(12) United States Patent
Winzeler

(10) Patent No.: US 8,096,588 B2
(45) Date of Patent: Jan. 17, 2012

(54) HOSE COUPLING

(75) Inventor: Michael D. Winzeler, Bryan, OH (US)

(73) Assignee: Winzeler Stamping Company, Montpelier, OH (US)

( * ) Notice: Subject to any disclaimer, the term of this patent is extended or adjusted under 35 U.S.C. 154(b) by 328 days.

(21) Appl. No.: 11/772,918

(22) Filed: Jul. 3, 2007

(65) Prior Publication Data

US 2008/0001400 A1 Jan. 3, 2008

Related U.S. Application Data

(60) Provisional application No. 60/818,441, filed on Jul. 3, 2006.

(51) Int. Cl.
*F16L 33/00* (2006.01)
*F16L 13/14* (2006.01)
(52) U.S. Cl. ............... 285/258; 285/242; 285/256
(58) Field of Classification Search ........ 285/242, 285/256, 259, 258; 29/507, 523
See application file for complete search history.

(56) References Cited

U.S. PATENT DOCUMENTS

| | | | |
|---|---|---|---|
| 1,915,041 A * | 6/1933 | Wallace | 285/258 |
| 2,040,834 A * | 5/1936 | Cowles | 285/256 |
| 2,228,018 A * | 1/1941 | Scholtes | 285/222.4 |
| 2,319,024 A * | 5/1943 | Wehringer | 285/256 |
| 2,338,666 A * | 1/1944 | Nelson | 29/507 |
| 2,631,047 A * | 3/1953 | Spender et al. | 285/148.15 |
| 2,634,786 A * | 4/1953 | Stinchcomb et al. | 29/523 |
| 2,825,588 A * | 3/1958 | Howard | 285/258 |
| 3,220,753 A * | 11/1965 | Kasidas | 285/148.15 |
| 3,345,090 A * | 10/1967 | Weatherhead, Jr. et al. | 285/256 |
| 3,791,680 A * | 2/1974 | Cleare | 285/148.13 |
| 4,220,359 A * | 9/1980 | Evenson et al. | 285/249 |
| 5,207,460 A * | 5/1993 | Oetiker | 285/258 |
| 5,295,718 A * | 3/1994 | Bartholomew | 285/258 |
| 5,326,137 A * | 7/1994 | Lorenz et al. | 285/55 |
| 5,356,182 A * | 10/1994 | Sanders | 285/258 |
| 5,370,425 A * | 12/1994 | Dougherty et al. | 285/39 |
| 5,380,050 A * | 1/1995 | Sanders et al. | 285/258 |
| 5,430,929 A * | 7/1995 | Sanders | 29/507 |
| 5,468,028 A * | 11/1995 | Olson | 285/322 |
| 6,308,993 B1 * | 10/2001 | Phillips | 285/256 |
| 7,108,292 B2 * | 9/2006 | Lipscomb et al. | 285/272 |
| 2003/0038478 A1 * | 2/2003 | Humphreys | 285/256 |
| 2004/0201213 A1 * | 10/2004 | Lipscomb et al. | 285/242 |

FOREIGN PATENT DOCUMENTS

| | | | |
|---|---|---|---|
| DE | 2332528 | * | 3/1925 |
| GB | 666183 A | | 2/1952 |
| GB | 211838 | * | 1/1975 |
| GB | 1525245 A | | 9/1978 |
| JP | 04296278 A | * | 10/1992 |

* cited by examiner

*Primary Examiner* — James Hewitt
(74) *Attorney, Agent, or Firm* — Fraser Clemens Martin & Miller LLC; J. Douglas Miller

(57) ABSTRACT

A hose coupling utilizing a main hollow body and an expandable inner sleeve and an intermediate end of a hose which is securely held in place upon radially outward expansion of the sleeve.

4 Claims, 1 Drawing Sheet

HOSE COUPLING

CROSS-REFERENCE TO RELATED APPLICATION

This application claims the benefit of U.S. Provisional patent application Ser. No. 60/818,441 filed Jul. 3, 2006.

FIELD OF THE INVENTION

The present invention relates to hose couplings and more particularly to a composite hose coupling for the end of a flexible resilient hose such as a garden hose.

BACKGROUND OF THE INVENTION

Garden hoses made of various forms of rubber and plastic are generally provided with male and female end couplings by which the hoses are connected to one another, to faucets or spigots supplying liquid thereto, and to nozzles, sprinklers, etc. for dispensing the liquid. On currently marketed hoses such couplings are permanently affixed to the hose ends during production of the hose assembly and commonly comprise threaded male and female couplers made of brass and include a ferrule placed over the outer end of the hose. A cylindrical tail piece of brass is introduced into the hose end and permanently expanded outwardly to urge the hose into liquid-tight engagement with the ferrule. These threaded male and female couplings may also be formed of plastic. In such couplings, a plastic cylindrical tail piece is inserted into the hose end and a clamp member, generally of brass, surrounds the external periphery of the hose and is crimped inwardly after being placed around the hose, to urge the hose into liquid-tight engagement with the tail piece.

The couplings have heretofore been fabricated either entirely of metal or entirely of plastic. However each of these has certain disadvantages. Thus, metallic couplings are costly to fabricate and assemble. Both the material itself and the forming process are expensive. In order to economically manufacture the metallic couplings, the couplings have been stamped from annealed brass stock.

To effectively reduce the cost of such couplings, it has been deemed desirable to produce a hose coupling utilizing a minimum of brass metal in the fabrication thereof.

SUMMARY OF THE INVENTION

It has surprisingly been discovered that a hose coupling may be produced wherein the structure is formed of a single plastic part containing the threads and an associated expandable sleeve insert for securing the coupling to the end of a hose.

In accordance with the invention, there is provided a hose coupling comprising a main hollow body formed of plastic material having a first end, a second end, an inner surface, an outer surface, and a hollow cylindrical section extending axially from the second end toward the first end and terminating in a radially inwardly projecting shoulder; a hollow expandable sleeve having a first end and a second end and disposed coaxially within the hollow cylindrical section of the main body with the first end abutting the inwardly projecting shoulder of the main body and an outer surface spaced from the inner surface of the main body defining a cylindrical zone therebetween of a first thickness; whereby a hollow flexible and resilient hose having a wall of a thickness greater than the first thickness of the zone between the outer surface of the expandable sleeve and the inner surface of the main body may be snugly received therebetween.

BRIEF DESCRIPTION OF THE DRAWINGS

The advantages of the invention may be readily understood by one skilled in the art from reading the following detailed description of an embodiment of the invention when considered in the light of the accompanying drawings, in which.

DETAILED DESCRIPTION OF THE PREFERRED EMBODIMENTS

Figure 1:
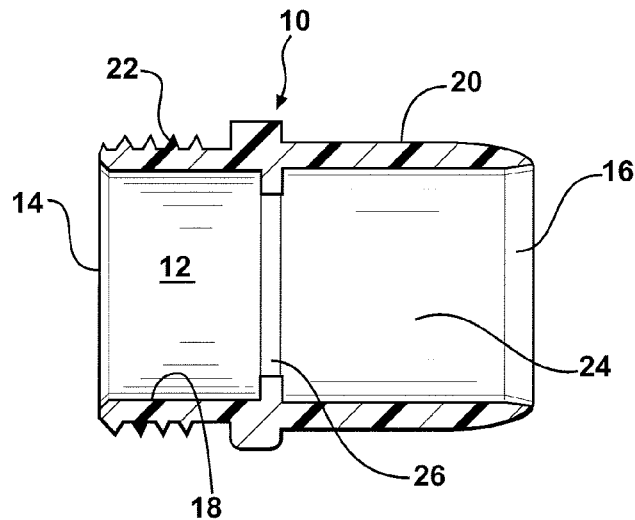
FIG. 1 is a sectional view of the main body of a male hose coupling incorporating the features of the invention.

Referring to the drawings, there is illustrated a male hose coupling embodying the features of the present invention and is generally noted by reference numeral 10.

The male hose coupling 10 includes a main hollow body 12 formed of a plastic material such as nylon, for example. As clearly illustrated in FIG. 1, the main body 12 has a first end 14, a spaced apart second end 16, an inner surface 18, an outer surface 20, a male threaded hollow cylindrical section 22 extending outwardly from the outer surface 20 adjacent the first end 14, and a hollow cylindrical section 24 extending axially from the second end 16 toward the first end 14 and terminating in a radially inwardly projecting annular shoulder 26. In the embodiment shown, the hollow cylindrical section 24 has a substantially uniform bore and an inner diameter substantially equal to an inner diameter of the threaded hollow cylindrical section 22.

While it has been found that the hollow body 12 will incorporate satisfactory structural characteristics by being molded from a nylon plastic material, the body 12 could be fabricated from other plastic materials such as polyolefins such as polypropylene or polyethylene, for example; polyamide, such as nylon; polyester; polyvinylalcohol; or polyacrylate.

Figure 2:
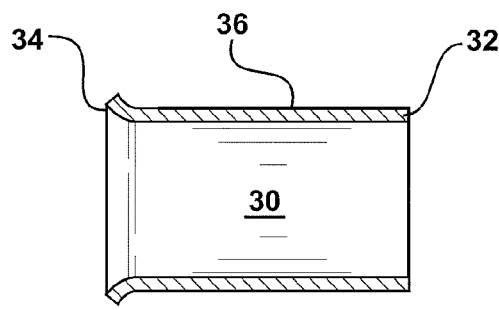
FIG. 2 is a sectional view of the expandable sleeve insert for use with the main body of a male coupling as illustrated in FIG. 1.
Figure 3:
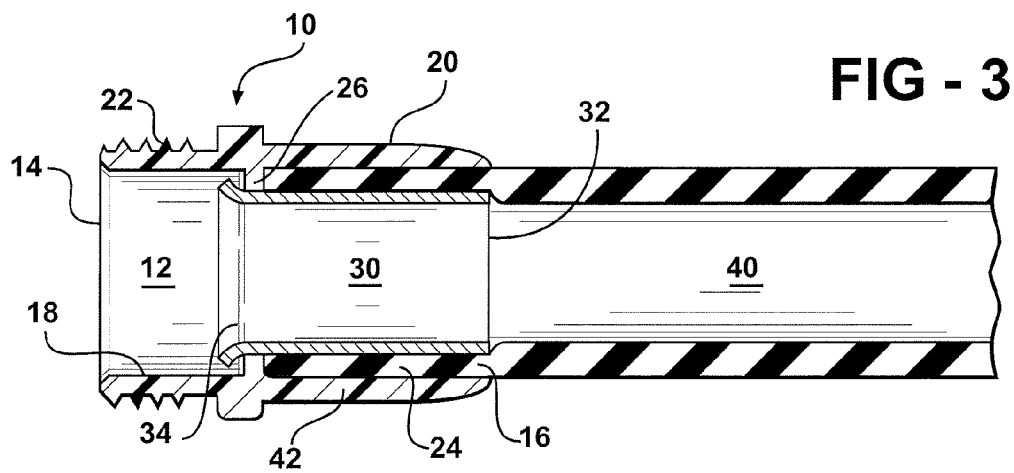
FIG. 3 is a sectional view of a male hose coupling utilizing the main body and the associated expandable sleeve insert illustrated in FIGS. 1 and 2 respectively coupled to one end of a hose.

FIG. 2 illustrates a cooperating hollow expandable sleeve 30 having a first end 32, and a spaced apart second end 34. The sleeve 30 is typically substantially cylindrical and fabricated from a brass material. The sleeve 30 is provided with a substantially smooth outer surface 36 which extends from the first end 32 to the second end 34. If desired, the outer surface 36 may contain undulations if found necessary. It has been found that satisfactory results may be achieved by slightly flaring the second end 34.

In assembling the hose coupling 10, the main body 12, and the hollow expandable sleeve 30 to a hose end, the following installation steps may be followed: Initially a garden-type hose 40 is provided. One free end 42 of the hose 40 is provided with the expandable sleeve 30 which is inserted into the hose 40. The insertion is accomplished by sliding or moving the first end 32 of the sleeve 30 into the interior of the hose 40 until the second end 34 is flush with the end of the hose 40.

Next, the free end 42 of the hose 40 containing the sleeve 30 is inserted into the hollow cylindrical section 24 of the main body 12. The insertion is complete when the free end of hose 40 and the second end 34 of the sleeve 30 abut against the ledge 26 of the main body 12.

Finally, the assembly described above is properly supported and expansion tooling is employed to effect radial outward expansion of the sleeve 30. Since the hollow cylindrical section 14 remains static and the sleeve 30 is radially expanded, the section of the hose 40 residing therebetween is snugly retained completing the fabrication of the hose coupling.

While the preferred embodiment of the invention is illustrated and described as a male hose coupling, it will be understood that satisfactory results may be achieved by repositioning the threaded section to the interior surface of the main body, for example, to produce a female coupling.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A hose coupling comprising:
    a main hollow body formed of plastic material having a first end, a second end, a first hollow cylindrical section extending axially from the second end toward the first end and terminating in a radially inwardly projecting shoulder, and a second hollow cylindrical section extending from the first end toward the second end and terminating at the shoulder, the first hollow cylindrical section having a substantially uniform bore;
    a hollow expandable sleeve having a first end and a second end and disposed coaxially within the first hollow cylindrical section of the main body, wherein the first end of the expandable sleeve is outwardly flared into the second hollow cylindrical section and abuts the inwardly projecting shoulder of the main body to limit a motion of the sleeve relative to the main body, and wherein an outer surface of the sleeve is spaced from an inner surface of the first hollow cylindrical section of the main body defining a cylindrical zone therebetween of a first thickness; and
    a hollow flexible and resilient hose having a wall of a thickness greater than the first thickness of the cylindrical zone between the outer surface of the expandable sleeve and the inner surface of the first hollow cylindrical section of the main body, wherein the hose is disposed in the cylindrical zone and an end of the hose is abutting the shoulder of the main body, and wherein the hollow expandable sleeve is expanded radially outwardly to secure the hose.

2. A hose coupling as defined in claim 1, wherein an inner diameter of the first hollow cylindrical section is substantially equal to an inner diameter of the second hollow cylindrical section.

3. A hose coupling as defined in claim 1, wherein the outer surface of the sleeve is substantially smooth.

4. A hose coupling as defined in claim 1, wherein an outer surface of the second hollow cylindrical section is threaded.

* * * * *